Feb. 5, 1957 J. S. CHANDLER 2,780,135
OBJECT SUPPORTING GYRATORY TABLE
Filed April 16, 1954 2 Sheets-Sheet 1

JASPER S. CHANDLER
INVENTOR.

BY

ATTORNEYS

Feb. 5, 1957 J. S. CHANDLER 2,780,135
OBJECT SUPPORTING GYRATORY TABLE
Filed April 16, 1954 2 Sheets-Sheet 2

JASPER S. CHANDLER
INVENTOR.

BY Daniel I. Mayne,
Robert F. Crocker

ATTORNEYS

United States Patent Office 2,780,135
Patented Feb. 5, 1957

2,780,135

OBJECT SUPPORTING GYRATORY TABLE

Jasper S. Chandler, Rochester, N. Y., assignor to Eastman Kodak Company, Rochester, N. Y., a corporation of New Jersey Application April 16, 1954, Serial No. 423,588

11 Claims. (Cl. 88—24)

In the manufacture of photographic film, it is essential that the film granularity, that is, the relative size of the individual particles of light-sensitive material, be maintained within predetermined limits. In order to measure the film granularity, it is customary to mount a sample of the flat film on a suitable support so that it extends across the space between two high aperture lenses of a suitable projecting apparatus in the focal plane thereof. The support is then caused to move in a circular path of relatively small diameter while being maintained at all times in the predetermined plane and the enlarged image of the photosensitive material is observed and compared with the predetermined desired standard. However, in order to obtain a true comparison it is essential that the film sample be maintained in the focal plane of the lens system to a very high degree of accuracy throughout its movement; for best results a plane movement to an accuracy of .00005 inch must be maintained. While there are obviously many arrangements which could be used to give this accuracy under ideal conditions, that is, while the apparatus was new and in a substantially perfect degree of cleanliness, wear on the parts and the eventual accumulation of dust will very rapidly cause known apparatuses to fail to maintain the desired degree of accuracy.

It is an object of this invention therefore to provide a table, so supported and arranged that it may be caused to move in a circular gyratory path in a given plane with an extremely high degree of accuracy and which, at the same time, will maintain this accuracy over a long period of time and use.

A further object of this invention is to provide such a gyratory table wherein the table itself is carried by a pair of relatively wide leaf springs from an intermediate support member which, in turn, is supported by a second pair of similar leaf springs, oriented at right angles to the first-mentioned pair, and in turn secured to a fixed base.

A still further object is to provide a gyratory table which is free of any sliding or rotating bearing surfaces, the wearing of which, or the accumulation of dust on which, would affect the degree of accuracy with which the table moves in a given plane.

Further objects and advantages will become apparent from the following description and claims, especially when considered in the light of the accompanying drawing wherein:

Figure 1:
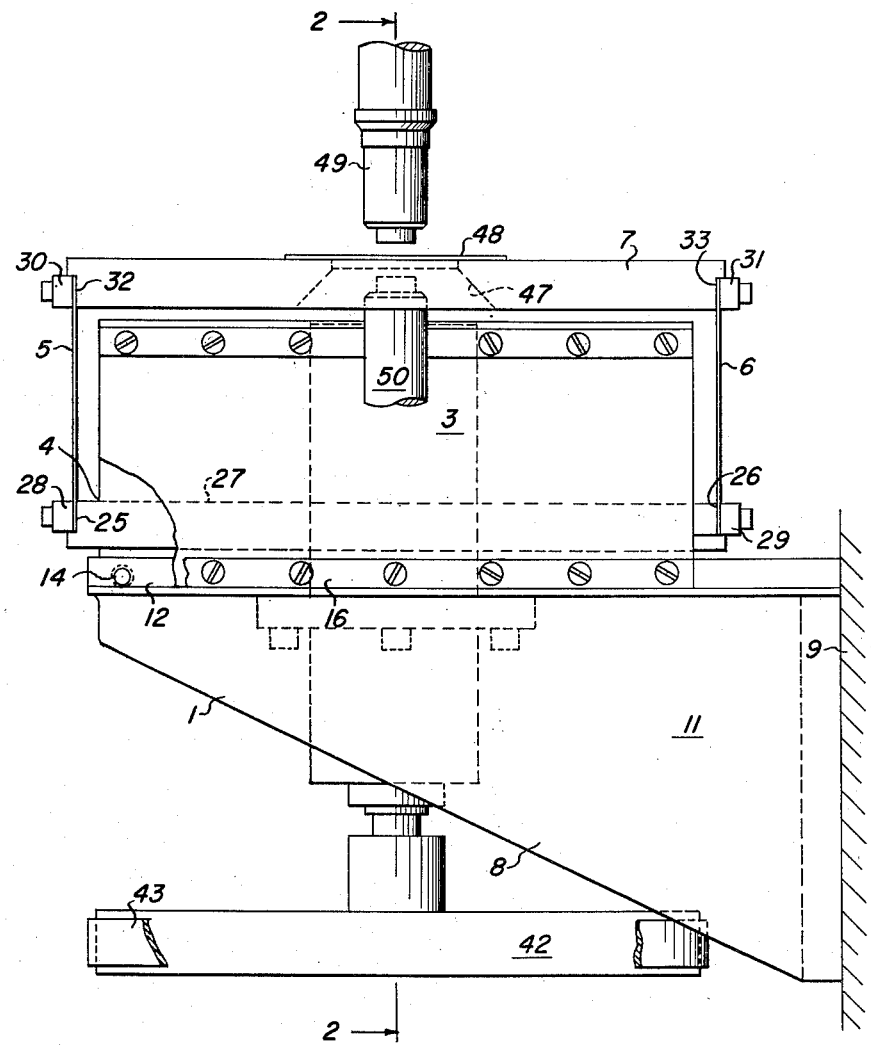
Fig. 1 is a side elevation view of the table of my invention with parts broken away to better show the interior construction.

As shown in the drawing, my improved gyratory table comprises a main support 1 which carries, through the agency of a pair of relatively wide resilient plates or leaf springs 2 and 3, an intermediate supporting member 4 so that the intermediate member is mounted for limited lateral swinging movement in a given plane while being constrained against all other movements. Similarly carried by means of a second pair of resilient plates or leaf springs 5, 6 which extend upwardly from the intermediate member 4, is the gyratory table 7, the arrangement being such that this table 7 is mounted for limited lateral swinging movement relative to the intermediate member 4 in a plane at right angles to the plane of movement of the member 4.

Figure 2:
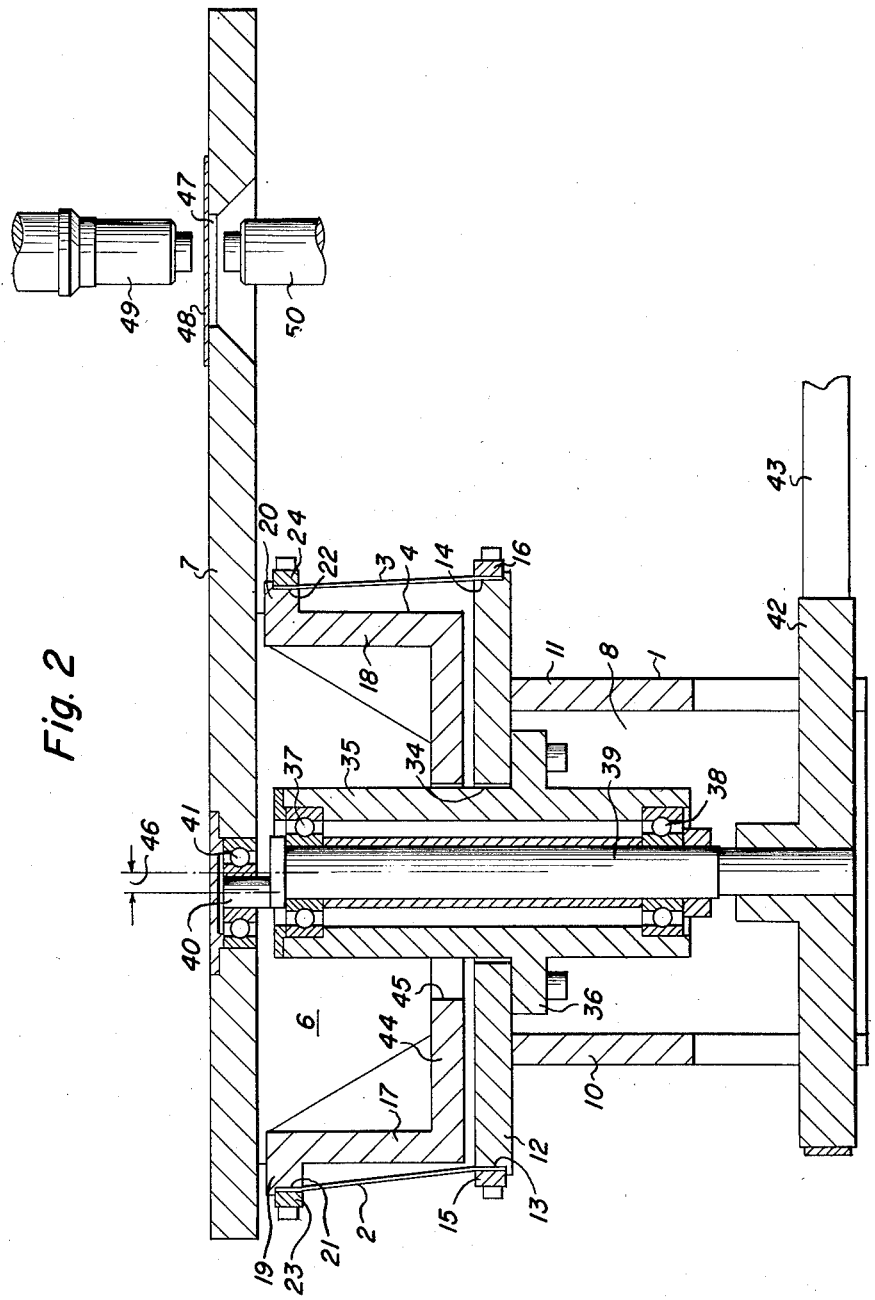
Fig. 2 is a cross-sectional view taken on the plane designated at 2—2 in Fig. 1.

While the main support or base member 1 may be of many different forms, it is shown herein as comprising a generally U-shaped bracket member 8, adapted to be rigidly secured, for example, to the wall of a building as indicated generally at 9 in Fig. 2 so that the arms 10 and 11 of the bracket extend outwardly from the wall. Rigidly secured to the upper edges of the arms 10 and 11 is a horizontal plate 12, the edges 13 and 14 of which are parallel to one another. The leaf springs 2 and 3 are secured along these edges of the plate 12 by means of suitable clamping members or bars 15 and 16, so that they extend generally upwardly from the plate in parallel relationship to one another.

In order to reduce the overall height the intermediate support member 4 is also generally U-shaped with the legs 17, 18 thereof extending generally upwardly. The upper ends of these legs are provided with outwardly directed flanges 19 and 20, the outer edges 21, 22 of which are parallel to, and spaced the same distance apart as, the corresponding edges 13, 14 of the plate 12. The upper ends of the springs 2 and 3 are rigidly clamped to these flanges by means of clamping bars 23, 24 so that the springs have the same effective length and are parallel to one another. Thus it can be seen that member 4 is mounted for limited oscillatory swinging movement relative to the base 1 in a vertical plane perpendicular to the plane surfaces of the springs 2 and 3 while at the same time it is constrained against any other movement relative to the base 1 by the springs themselves.

As best shown in Fig. 1, the second pair of relatively wide leaf springs 5 and 6 are rigidly secured to the parallel edges 25 and 26 of bottom plate 27 of member 4 by means of clamping members 28 and 29 so that the springs 5 and 6 extend upwardly somewhat beyond the upper end of the member 4 where they are clamped, as by clamping bars 30 and 31, to the corresponding edges 32 and 33 of the table 7. Like springs 2 and 3, springs 5 and 6 have the same effective length and are parallel to one another but are oriented at right angles to the spring members 2 and 3. Thus it can be seen that table 7 is free to oscillate laterally with respect to the intermediate supporting member 4 in a vertical plane which is oriented at right angles to the plane of movement of the intermediate member 4 and is, at the same time, constrained against any other movement relative to this member 4.

The means for causing the table 7 to move with a circular gyratory motion comprises the following elements. The central portion of the plate 12 is provided with an opening 34 through which extends a generally cylindrical bearing sleeve 35, rigidly secured to the plate by means of a flange 36. Journalled in the sleeve 35 by means of suitable upper and lower bearings 37 and 38 is a vertically extending actuating shaft 39, the upper end of which is provided with an eccentric pin 40 adapted to engage a mating bearing 41 rigidly secured to the table 7. At its lower end, shaft 39 is provided with a drive pulley 42 which is adapted to be rotated during operation of the table in any suitable manner, as for example by means of a belt 43 driven by a suitable motor (not shown). Thus the table is caused to bodily move with a circular gyratory motion, the component of movement in one direction being permitted by deflection of springs 2 and 3 and that in the perpendicularly related direction being permitted by deflection of springs 5 and 6. The bottom plate 44 of the member 4 is, of course, provided with a suitable slot 45 to provide the necessary clearance about the sleeve 35 for movement of the member 4 relative thereto.

Bearing 41 is so located in table 7 that, as the eccentric pin 40 rotates about the axis of shaft 39 it will cause the upper ends of the springs of each pair to deflect equal amounts to one side or the other of their neutral, vertical positions. To this end the bearing 41 is so positioned that when the shaft is rotated to a position wherein a horizontal line from the axis of pin 40 to the axis of shaft 39 is oriented parallel to either pair of resilient plates, that pair of plates will be in their neutral, vertical or undeflected positions (note springs or plates 5 and 6 in Fig. 1). The arrangement is therefore such that when one pair of springs is deflected to its maximum extent in either direction due to the action of the eccentric 40 on the table 7 the other pair of springs will be in their neutral or vertical position. It should be noted that the effective or free vertical length of each of the springs between its clamped ends is considerably greater than the radius of eccentricity 46 of pin 23. So long as this ratio is at least 10 to 1, it can be shown mathematically that the slight vertical component of motion which will be produced due to the arcuate swinging of the upper ends of one pair of springs will at any time be almost perfectly compensated for by the component of vertical movement in the opposite direction due to the opposite swinging of the upper ends of the other pair of springs. Thus, when as shown in Fig. 2, the intermediate member 4 is at its lowermost position, due to the fact that springs 2 and 3 have been deflected to their maximum extent in one direction from their vertical, neutral positions, springs 5 and 6 will be vertical. As the eccentric 40 then moves about its circular path, member 4 will move toward the right and slightly upwardly as springs 2 and 3 swing toward their neutral position, but at the same time the upper ends of springs 5 and 6 will be moving downwardly at substantially the same rate, with the result that the table 7 will be maintained at all times in substantially the same horizontal plane. The longer the springs are, relative to the throw of the eccentric, the higher the degree of accuracy that can theoretically be attained, but the proportions shown in the drawing have been found to be more than satisfactory to maintain an extremely high over-all degree of accuracy.

Where, as in this case, the table is intended to support a film sample during granularity measurements, the table is provided with a suitable opening 47 to one side of the supporting structure, the film sample, indicated at 48, being suitably supported over this opening so that it lies between the sections 49 and 50 of the optical projection apparatus, in the focal plane of the objective lenses thereof (not shown).

In operation when the film has been secured by suitable means (not shown) onto the inspection portion of the table, the pulley 25 will be caused to rotate at a desired speed by means of belt 26, thus rotating shaft 22 and causing the eccentric 23 to travel a circular path in a horizontal plane. This will cause all points on the table 7 to follow a similar path, the pairs of springs 2 and 3, 5 and 6, being alternately deflected in opposite directions from their neutral positions to permit such movement of the table and, as previously explained, restraining the table against any other movement.

The movement of the table will be extremely smooth and free of undesirable vibrations. This smooth action is in part due to the fact that the vector sum of the forces acting upon the table due to the deflection of the springs will at all times be constant and will moreover act directly radially toward the axis of shaft 39. Thus there is no tendency of the table to favor any particular position and no variation in force such as would tend to set up unwanted vibration.

The only points subject to wear are at the bearings on shaft 39 and eccentric pin 40 and any wear which might occur at these points would be in a direction parallel to the plane of movement of the table and would therefore have substantially no adverse effect on the accuracy of the device.

For maximum stability and accuracy the spring members 2, 3, 5 and 6 should be as nearly identical to one another as is possible and should preferably be as thick as is possible consistent with the deflection required.

While in the specification the table has been described as being mounted for movement in a horizontal plane, the device is equally capable of use in other positions of orientation and in fact a similar unit has been successfully operated turned on its side so that the table moved in a vertical plane. Preferably however, when any but the horizontal orientation is used, the table 7 should be symmetrical and the shaft 39 counterbalanced to reduce any tendency to vibration due to the otherwise unbalanced loading on the shaft.

As will be obvious to those skilled in the art, many variations in the detailed form and construction of the device may be made without altering the principle of operation of the invention and such changes are deemed to come within the spirit and scope of the invention as defined by the appended claims.

I claim:

1. In combination, a support, a table, and means for supporting said table from said support for circular gyratory movement relative thereto in a predetermined plane, comprising a member interposed between and spaced from said support and said table, a first pair of spaced, parallel, resilient plates rigidly secured to said support and to said member and mounting said member for limited oscillatory swinging movement in a plane perpendicular to said plates and to said plane of gyration while constraining said member against any other movement, and a second pair of similar, spaced, parallel resilient plates rigidly secured to said member and to said table and mounting said table for limited oscillatory swinging movement relative to said member in a plane oriented at right angles to the plane of movement of said member and perpendicular to said plane of gyration while restraining said table against any other movement relative to said member, and means engaging said table for causing it to move with a bodily circular movement in said plane of gyration.

2. In combination, a support, a table, and means for supporting said table from said support for circular gyratory movement relative thereto in a predetermined plane, comprising a member interposed between and spaced from said support and said table, a first pair of spaced, parallel, resilient plates rigidly secured to said support and to said member and mounting said member for limited oscillatory swinging movement in a plane perpendicular to said plates and to said plane of gyration while constraining said member against any other movement, and a second pair of similar, spaced, parallel resilient plates rigidly secured to said member and to said table and mounting said table for limited oscillatory swinging movement relative to said member in a plane oriented at right angles to the plane of movement of said member and perpendicular to said plane of gyration while restraining said table against any other movement relative to said member, and means engaging said table for causing it to move with a bodily circular movement in said plane of gyration, said plates being so positioned that when said table is in a position wherein the plates of either pair are at either limit of their deflection the plates of the other pair will be undeflected and perpendicular to said plane of gyration.

3. In a device for supporting a first member for circular gyratory movement in a given plane relative to a second member, in combination with said first and second members a third member interposed between said first and second members and two pairs of resilient plates, interconnecting said members, the plates of each pair being spaced apart and arranged parallel to one another, and the plates of one pair being oriented about an axis perpendicular to said given plane 90° with respect to those of the other pair, one pair of plates being rigidly connected at their ends to the first and third members and the other pair being rigidly connected at their ends to the second and third members, whereby the portions of each of said plates extending between its associated members is free to deflect laterally in the direction of its thickness, the lengths of all of said deflectable portions being the same and the lines defining the ends thereof being parallel to said given plane.

4. In a device for supporting a first member for circular gyratory movement in a given plane relative to a second member, in combination with said first and second members a third member interposed between said first and second members and two pairs of resilient plates, interconnecting said members, the plates of each pair being spaced apart and arranged parallel to one another, and the plates of one pair being oriented about an axis perpendicular to said given plane 90° with respect to those of the other pair, one pair of plates being rigidly connected at their ends to the first and third members and the other pair being rigidly connected at their ends to the second and third members, whereby the portion of each of said plates extending between its associated members is free to deflect laterally in the direction of its thickness, the lengths of all of said deflectable portion being the same and the lines defining the ends thereof being parallel to said given plane, and actuating means engaging said table for causing any point thereon to move in a circular path parallel to said given plane, said actuating means being so located relative to said plates that when a line parallel to said plane and extending from any point on the table to its center of gyration is parallel to either pair of said plates, the plates of that pair will be perpendicular to said plane.

5. In combination, a support, a table and means for supporting said table from said support for circular gyratory movement relative thereto in a predetermined plane comprising a member spaced from said support and a first pair of spaced, parallel resilient plates rigidly secured to said support and to said member and mounting said member for limited oscillatory movement in a plane perpendicular to said plates and to said predetermined plane while constraining said member against any other movement, said table spaced from said member, on the side thereof opposite said support, and a second pair of similar spaced, parallel resilient plates rigidly secured to said member and to said table and mounting said table for limited oscillatory movement relative to said member in a plane oriented at right angles to the plane of movement of said member and to said predetermined plane while constraining said table against any other movement relative to said member.

6. In combination, a support, a table and means for supporting said table from said support for circular gyratory movement relative thereto in a predetermined plane comprising a member spaced from said support and a first pair of spaced, parallel resilient plates rigidly secured to said support and to said member and mounting said member for limited oscillatory movement in a plane perpendicular to said plates and to said predetermined plane while constraining said member against any other movement, said table spaced from said member on the side thereof opposite said support, and a second pair of similar spaced, parallel resilient plates rigidly secured to said member and to said table and mounting said table for limited oscillatory movement relative to said member in a plane oriented at right angles to the plane of movement of said member and to said predetermined plane while constraining said table against any other movement relative to said member, and means for imparting a circular gyratory translational movement to said table in said predetermined plane.

7. In combination, a support, a table and means for supporting said table from said support for circular gyratory movement relative thereto in a predetermined plane comprising a member spaced from said support and a first pair of spaced, parallel resilient plates rigidly secured to said support and to said member and mounting said member for limited oscillatory movement in a plane perpendicular to said plates and to said predetermined plane while constraining said member against any other movement, said table spaced from said member, on the side thereof opposite said support, and a second pair of similar spaced, parallel resilient plates rigidly secured to said member and to said table and mounting said table for limited oscillatory movement relative to said member in a plane oriented at right angles to the plane of movement of said member and to said predetermined plane while constraining said table against any other movement relative to said member, said plates of each pair being so positioned that they are parallel to the axis of gyration of any point on said table when a line through that point and perpendicular to said axis is parallel to that particular pair of plates.

8. In combination, a main support, a first pair of relatively wide rectangular resilient plates having their lower edges rigidly secured to said main support and extending upwardly therefrom in spaced, parallel relationship to one another, an intermediate supporting member rigidly secured to and supported by the upper edges of said pair of plates, a second pair of similar, resilient plates having their lower edges rigidly secured to said intermediate support member and extending upwardly therefrom in spaced parallel relationship to one another, said second pair of plates being oriented 90° about a vertical axis with respect to said first pair of plates, and a table rigidly secured to and supported by the upper edges of said second pair of plates whereby said table is supported for substantially circular translational movement relative to said base in a given horizontal plane.

9. In combination, a main support, a first pair of relatively wide rectangular resilient plates having their lower edges rigidly secured to said main support and extending upwardly therefrom in spaced, parallel relationship to one another, an intermediate supporting member rigidly secured to and supported by the upper edges of said pair of plates, a second pair of similar, resilient plates having their lower edges rigidly secured to said intermediate support member and extending upwardly therefrom in spaced parallel relationship to one another, said second pair of plates being oriented 90° about a vertical axis with respect to said first pair of plates, and a table rigidly secured to and supported by the upper edges of said second pair of plates whereby said table is supported for substantially circular translational movement relative to said base in a given horizontal plane, a vertical actuating shaft rotatably supported from said base and having an eccentric pin formed on the upper end thereof and rotatably connected to said table for imparting such movement to said table.

10. In combination, a main support, a first pair of relatively wide rectangular resilient plates having their lower edges rigidly secured to said main support and extending upwardly therefrom in spaced, parallel relationship to one another, an intermediate supporting member rigidly secured to and supported by the upper edges of said pair of plates, a second pair of similar, resilient plates having their lower edges rigidly secured to said intermediate support member and extending upwardly therefrom in spaced parallel relationship to one another, said second pair of plates being oriented 90° about a vertical axis with respect to said first pair of plates, and a table rigidly secured to and supported by the upper edges of said second pair of plates whereby said table is supported for substantially circular translational movement relative to said base in a given horizontal plane, a vertical actuating shaft rotatably supported from said base and having an eccentric pin formed on the upper end thereof and rotatably connected to said table for imparting such movement to said table, the axis of the rotatable connection between said pin and said table being so located that when a horizontal line passing through said connection and the axis of said shaft is parallel to the springs of either pair, that pair of springs will lie in vertical planes.

11. In combination, a main support, a first pair of relatively wide rectangular resilient plates having their lower edges rigidly secured to said main support and extending upwardly therefrom in spaced, parallel relationship to one another, an intermediate supporting member rigidly secured to and supported by the upper edges of said pair of plates, a second pair of similar, resilient plates having their lower edges rigidly secured to said intermediate support member and extending upwardly therefrom in spaced parallel relationship to one another, said second pair of plates being oriented 90° about a vertical axis with respect to said first pair of plates, and a table rigidly secured to and supported by the upper edges of said second pair of plates whereby said table is supported for substantially circular translational movement relative to said base in a given horizontal plane, said intermediate supporting member being generally U-shaped and the connections between the first pair of plates and said intermediate member being adjacent the upper ends of the legs thereof, and the connections between the second pair of plates and said intermediate member being made to the cross member thereof.

References Cited in the file of this patent
UNITED STATES PATENTS

| Number | Name | Date |
|---|---|---|
| 560,338 | Betts | May 19, 1896 |
| 885,082 | Preston | Apr. 21, 1908 |
| 907,045 | Harrison | Dec. 15, 1908 |
| 961,814 | Snyder | June 21, 1910 |
| 1,188,903 | Cornwall | June 27, 1916 |
| 1,798,634 | Schafer | Mar. 31, 1931 |
| 1,935,306 | Zarkin | Nov. 14, 1933 |
| 2,069,067 | Hoffman | Jan. 26, 1937 |
| 2,173,162 | Gilluly | Sept. 19, 1939 |
| 2,192,233 | Mack | Mar. 5, 1940 |
| 2,230,573 | Mestre | Feb. 4, 1941 |
| 2,305,344 | Gary | Dec. 15, 1942 |
| 2,372,791 | Munro | Apr. 3, 1945 |
| 2,411,804 | Plebanek | Nov. 26, 1946 |
| 2,440,931 | Casson | May 4, 1948 |